(12) United States Patent
Shim

(10) Patent No.: US 7,114,819 B2
(45) Date of Patent: Oct. 3, 2006

(54) APPARATUS FOR FIXING REFLECTION MIRROR OF LASER SCANNING UNIT

(75) Inventor: Hyeong-seong Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/824,486

(22) Filed: Apr. 15, 2004

(65) Prior Publication Data
US 2005/0105198 A1    May 19, 2005

(30) Foreign Application Priority Data
Nov. 17, 2003   (KR)   .................. 10-2003-0080934

(51) Int. Cl.
*G02B 7/182* (2006.01)
(52) U.S. Cl. ...................................... 359/879
(58) Field of Classification Search ............... 359/879, 359/871, 872, 819, 205
See application file for complete search history.

(56) References Cited

U.S. PATENT DOCUMENTS

| 4,869,582 A | 9/1989 | Nakajima et al. ........... 350/631 |
| 5,390,051 A | 2/1995 | Saito et al. .................. 359/872 |
| 5,592,337 A | 1/1997 | Hama ......................... 359/872 |
| 6,690,498 B1 | 2/2004 | Shim .......................... 359/216 |

FOREIGN PATENT DOCUMENTS

| JP | 05196855 | 8/1993 |
| JP | 06235876 | 8/1994 |
| JP | 09073039 | 3/1997 |
| JP | 10010451 | 1/1998 |
| JP | 2002323667 | 11/2002 |
| JP | 2002350761 | 12/2002 |

*Primary Examiner*—Euncha P. Cherry
(74) *Attorney, Agent, or Firm*—Roylance, Abrams, Berdo & Goodman, LLP

(57) ABSTRACT

An apparatus for stably fixing a reflection mirror of a laser scanning unit to a frame. The apparatus comprises a reflection mirror, a frame receiving and supporting the reflection mirror, fixing pieces disposed in the frame and having a connection surface which is slanted at a predetermined angle so as to tightly contact one side of the reflection mirror, support blocks supporting the other side of the reflection mirror, and clamps clamping the fixing pieces and the reflection mirror in order to tightly contact the reflection mirror and the connection surfaces of the fixing pieces.

9 Claims, 3 Drawing Sheets

APPARATUS FOR FIXING REFLECTION MIRROR OF LASER SCANNING UNIT

CROSS-REFERENCE TO RELATED APPLICATIONS

This application claims the benefit under 35 U.S.C. § 119(a) of Korean Application No. 2003-80934, filed Nov. 17, 2003, in the Korean Intellectual Property Office, the disclosure of which is incorporated herein by reference in its entirety.

BACKGROUND OF THE INVENTION

1. Field of the Invention

The present invention relates to a laser scanning unit of an electrophotographic image forming apparatus. More particularly, the present invention relates to a fixing apparatus of a laser scanning unit, which fixes the reflection mirror for reflecting a laser beam emitted from a laser unit in the direction of a photoconductive medium.

2. Description of the Related Art

A laser printer which is a kind of electrophotographic image forming apparatus, forms an electrostatic latent image by focusing a laser beam emitted from a laser unit of a laser scanning unit, develops the electrostatic latent image on the photoconductive medium by a toner, and transfers a toner image to a printing medium such as paper. Thus, an image is formed.

As shown in FIGS. 1A and 1B, the laser scanning unit comprises the laser unit 2 at a certain position of a frame 1, and a cylindrical lens 3 and a polygon mirror 4 which are arranged in a direction of the laser beam emitted from the laser unit 2. The laser beam is scanned by the polygon mirror 4, passes through a focus lens 5 and is reflected off of a reflection mirror 6 and strikes a photoconductive drum (not illustrated) located outside of frame 1.

Additionally, a pair of fixing pieces 8 and 8' are located in the frame 1 to fix the reflection mirror 6. FIG. 1B shows the typical alignment of the polygon mirror 4 to the reflection mirror 6.

The fixing pieces 8 and 8' respectively have a connection surface 8a, as shown in FIG. 2, which is slanted at a predetermined angle. The reflection mirror 6 is fixed to the fixing pieces 8 and 8' by a pair of clamps 9 such that the reflection surface 6a is in tight contact with the connection surface 8a. Therefore, a reflecting position is fixed regardless of thickness of the reflection mirror 6.

In the above general laser scanning unit, the laser beam emitted from the laser unit 2 passes through a collimation lens (not illustrated) and the cylindrical lens 3 and strikes the polygon mirror 4. The laser beam is reflected by the polygon mirror 4, focused by the focus lens 5, reflected by the reflection mirror 6 and strikes the photoconductive drum.

The reflection mirror 6 reflects the laser beam in a predetermined direction to allow the laser beam to strike a surface of the photoconductive drum. Therefore, the reflection mirror 6 needs to be stably fixed in the frame 1.

However, the reflection mirror 6 of the prior art general laser scanning units is fixed to the fixing pieces 8 and 8' of the frame 1 simply by the clamp 9. Therefore, as the elasticity of clamp 9 changes, or as the frame 1 is distorted, the reflection mirror 6 can be released from the connection surface 8a of the fixing pieces 8 and 8'. If an apparatus vibrates during the operation, such unstable fixation of the reflection mirror 6 may cause a jitter of the reflection mirror 6 or a deviation of the reflection angle. As a result, a jitter or a deviation of the image may occur.

SUMMARY OF THE INVENTION

The present invention solves at least the above problems and disadvantages and provides at least the advantages described below among others. Accordingly, an aspect of the present invention is to provide an apparatus for fixing a reflection mirror of a laser scanning unit having a three-point supporting structure for stable fixation of the reflection mirror.

In order to achieve the above-described aspects of the present invention, there is provided an apparatus for fixing the reflection mirror of the laser scanning unit comprising a reflection mirror. The apparatus comprises a frame for receiving and supporting the reflection mirror, at least one fixing piece disposed in the frame having a connection surface which is slanted a predetermined angle so as to be in tight contact with one side of the reflection mirror, at least one support block located near the at least one fixing piece to support the other side of the reflection mirror, and at least one clamp clamping the at least one fixing piece and the reflection mirror to maintain tight contact between the reflection mirror and the connection surface of the at least one fixing piece.

According to the above structure, the reflection mirror is fixed at three points. More specifically, the reflection mirror is fixed on one side to the connection surface of the fixing piece, on the other side to the support block, and on another portion of the other side to the clamp. Therefore, the reflection mirror is more stably fixed than in the conventional fixing structure.

According to an embodiment of the present invention, the pair of support blocks are preferably shaped as a triangle having a predetermined slant surface for contacting the side of the reflection mirror. In other embodiments, the support blocks may be shaped in any configuration that results in stable fixation of the reflection mirror.

The support block may be integrally formed with the frame at the bottom. Alternatively, the support block may be formed separately and attached on to the bottom of the frame. The pair of fixing pieces may also be integrally formed with the frame at the bottom, or alternatively, may be formed separately and attached on the bottom of the frame.

The pair of fixing pieces may be integrally formed with the frame at the bottom, or alternatively, may be formed separately and attached on the bottom of the frame.

BRIEF DESCRIPTION OF THE DRAWINGS

The above aspect and other features of the present invention will become more apparent by describing in detail an exemplary embodiment thereof with reference to the attached drawings.

DETAILED DESCRIPTION OF THE EXEMPLARY EMBODIMENTS

Exemplary embodiments of the present invention will now be described in detail with reference to the accompanying drawings.

Figure 1A:
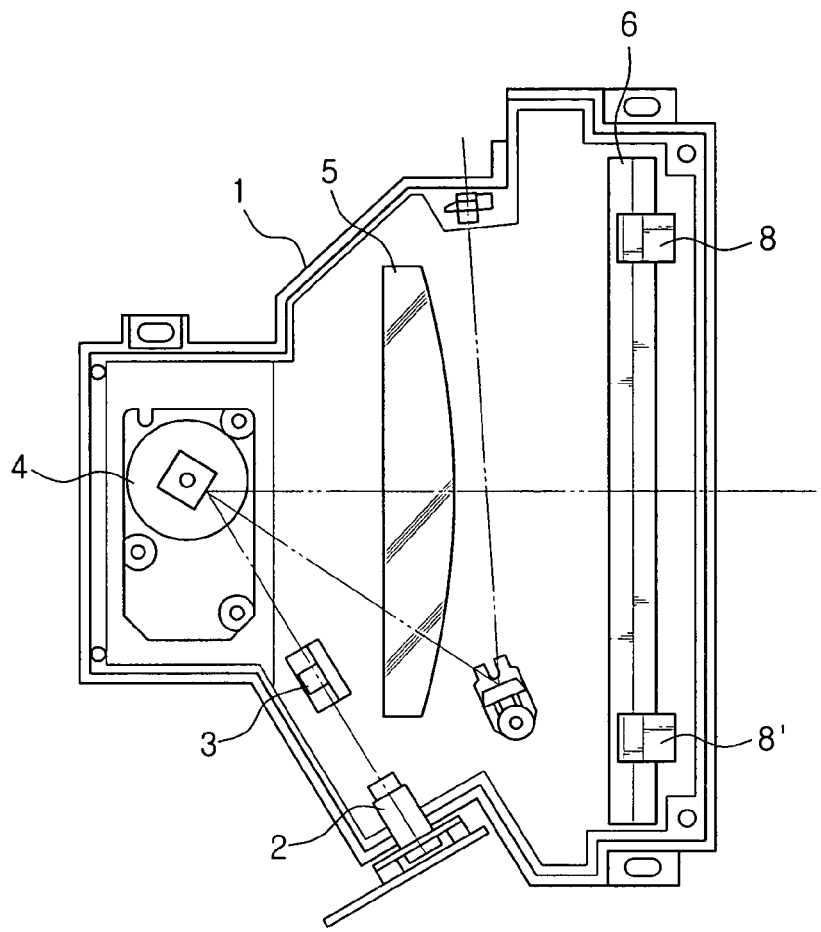
FIGS. 1A and 1B are a cross-sectional view and a longitudinal sectional view of conventional general laser scanning units, respectively.
Figure 1B:
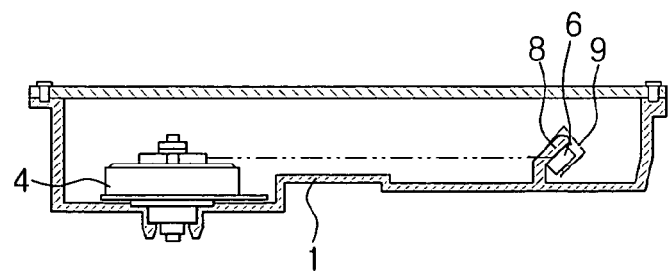
Figure 2:
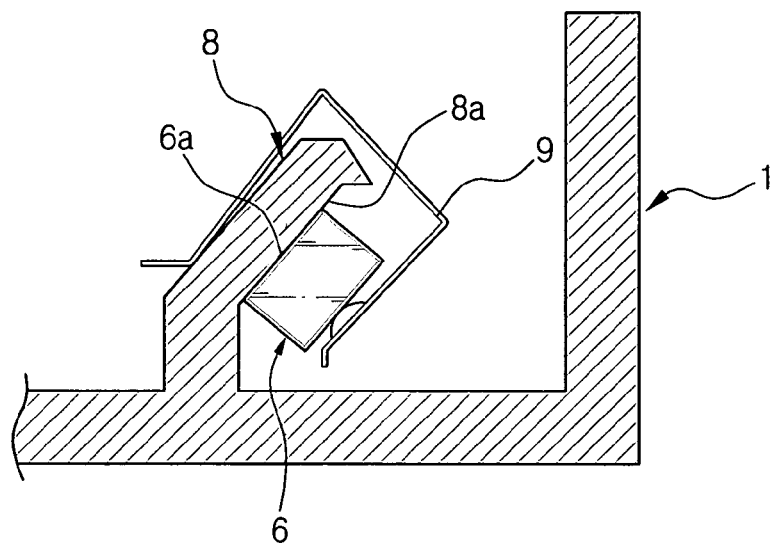
FIG. 2 is an enlarged sectional view showing an apparatus for fixing a reflection mirror of the conventional general laser scanning unit.
Figure 3:
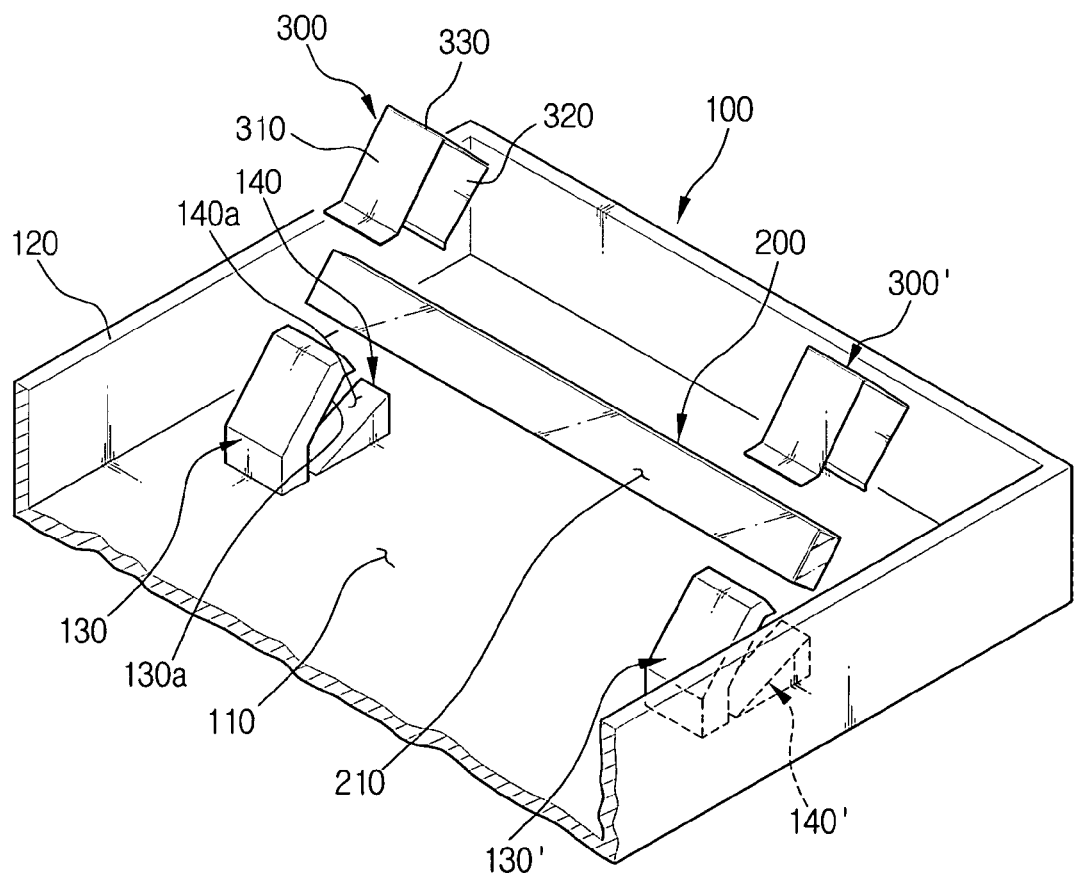
FIG. 3 is an exploded perspective view of the fixing apparatus of the laser scanning unit according to an embodiment of the present invention.
Figure 4:
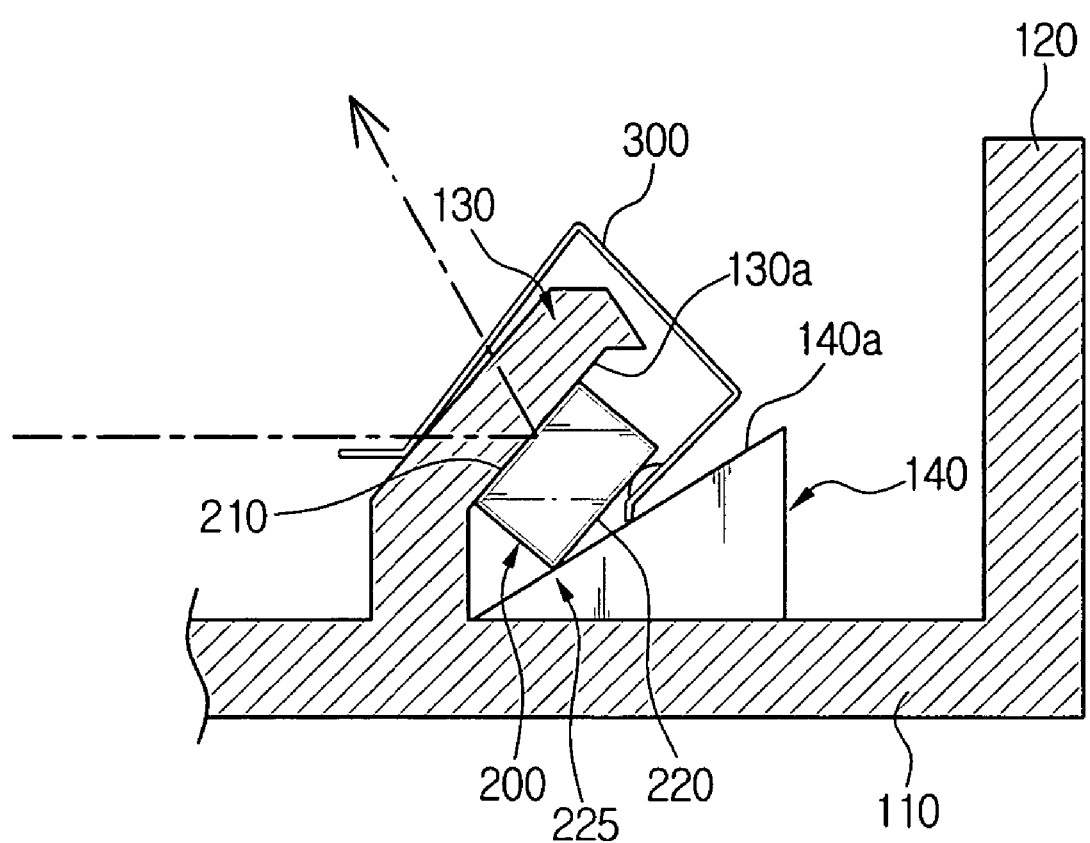
FIG. 4 is a cross-sectional view of FIG. 3 in an assembled state.

FIGS. 3 and 4 show a frame 100, a reflection mirror 200, and a pair of clamps 300 and 300'.

The frame 100 comprises a bottom surface 110, and sidewalls 120. A pair of fixing pieces 130 and 130' are disposed on the bottom surface 110 of the frame 100 to support the reflection mirror 200.

As shown in FIG. 4, the fixing piece 130 maintains reflection mirror 200 at a predetermined reflection angle in the frame 100 by using clamp 300 to hold reflection surface 210 in tight contact with connection surface 130a. Connection surface 130a is slanted at a predetermined angle so as to be in tight contact with reflection surface 210 of the reflection mirror 200. The reflection mirror 200 is supported by the fixing pieces 130 and 130' in a position so that the reflection surface 210 is in tight contact with the connection surface 130a of the fixing pieces 130 and 130'. The fixing pieces 130 and 130' may be integrally formed with the bottom surface 110. Alternatively, the fixing pieces 130 and 130' may be separately formed and attached to corresponding positions of the bottom surface 110 of the frame 100.

A pair of support blocks 140 and 140' are further provided on the bottom surface 110 of the frame 100 to support a portion 225 of the reverse surface 220 of the reflection mirror 200. The portion 225 of the reverse surface 220 is preferably at an edge of the reverse surface 220.

The support blocks 140 and 140' are preferably shaped in a triangle having a slanted surface 140a at a predetermined angle to contact a portion 225 of the reverse surface 220 of the reflection mirror 200. However, the shape of the support blocks 140 and 140' is not limited as long as they can support a portion 225 of the reverse surface 220 of the reflection mirror 200. The support blocks 140 and 140' may be integrally formed with the bottom surface 110 of the frame 100, or alternatively, may be separately formed and attached to the bottom surface 110 of the frame 100.

The clamps 300 and 300' are for clamping the fixing pieces 130 and 130' on the reflection mirror 200 to maintain tight contact between the reflection mirror 200 and the connection surface 130a of the fixing pieces 130 and 130'. The clamps 300 and 300' have a well-known structure in which the pair of elastic parts 310 and 320 are connected by a connection part 330. The elastic parts 310 and 320 are elastically biased inward. Fixing pieces 130 and 130' and the reflection mirror 200 in this embodiment are kept in tight contact with each other by elastic parts 310 and 320.

As shown in the embodiment of FIG. 3, the reflection mirror 200 is inserted between the pair of fixing pieces 130 and 130' and support blocks 140 and 140' which are formed on the bottom surface 110 of the frame 100. Therefore, the reflection mirror 200 is assembled with the reflection surface 210 being supported on the connection surface 130a of the fixing pieces 130 and 130', and the portion 225 of the reverse surface 220 of the reflection mirror 200 being supported on the slant surface 140a of the support blocks 140 and 140'.

In the above state, the fixing pieces 130 and 130' and the reflection mirror 200 are clamped by the clamps 300 and 300' so that the reflection mirror 200 tightly contacts the fixing pieces 130 and 130' of the frame 100.

As shown in FIG. 4, the reflection mirror 200 is stably fixed in at least three points of the fixing apparatus. The reflection surface 210 is supported on the connection surface 130a of the fixing pieces 130 and 130', the portion 225 of the reverse surface 220 of the reflection mirror 200 is supported on the slant surface 140a of the support blocks 140 and 140'(shown in FIG. 3), and the non-reflection surface 220 is supported by the clamps 300 and 300'. Therefore, the reflection mirror 200 can be in a stable position with minimal support from the clamps 300 and 300' or a distortion of the frame 110.

Referring again to FIG. 3, the reflection mirror 200 is stably fixed against the fixing pieces 130 and 130' of the frame 100 by the three-point supporting structure. Therefore, if the image forming apparatus vibrates or the frame 100 is distorted, the reflection mirror 200 is not affected. Accordingly, the deviation or a jitter of the image is minimized, and thus, the product quality can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for fixing a reflection mirror of a laser scanning unit, comprising:
   a reflection mirror;
   a frame receiving and supporting the reflection mirror;
   at least one fixing piece integrally formed with a bottom surface of the frame and having a connection surface which is slanted at a predetermined angle so as to be in tight contact with a reflection surface of the reflection mirror;
   at least one support block supporting a portion of a reverse surface of the reflection mirror; and
   at least one clamp for clamping the at least one fixing piece and the reflection mirror together in order to tightly contact the reflection mirror and the connection surface of the at least one fixing piece.

2. The fixing apparatus of claim 1, wherein the at least one support block is shaped in a triangle having a predetermined slant surface for contacting said portion of the reverse surface of the reflection mirror.

3. The fixing apparatus of claim 2, wherein the at least one support block is integrally formed with the bottom surface of the frame.

4. The fixing apparatus of claim 1, wherein the at least one support block has a slanted surface angled to maintain tight contact between the connection surface of the fixing piece and the reflection surface of the mirror.

5. An apparatus for fixing a reflection mirror of a laser scanning unit, comprising:
   a reflection mirror;
   a frame receiving and supporting the reflection mirror;
   at least one fixing piece integrally formed with a bottom surface of the frame and extending from the bottom of the frame and having a connection surface which is slanted at a predetermined angle so as to be in tight contact with a reflection surface of the reflection mirror;
   at least one support block supporting a portion of a reverse surface of the reflection mirror and;
   means for clamping the at least one fixing piece and the reflection mirror together in order to tightly contact the reflection mirror and the connection surface of the at least one fixing piece.

6. The fixing apparatus of claim 5, wherein the at least one support block is shaped in a triangle having a predetermined slant surface for contacting said portion of the reverse surface of the reflection mirror.

7. The fixing apparatus of claim 6, wherein the at least one support block is integrally formed with the bottom surface of the frame.

8. The fixing apparatus of claim 5, wherein the at least one support block has a slanted surface angled to maintain tight contact between the connection surface of the fixing piece and the reflection surface of the mirror.

9. The fixing apparatus of claim 5, wherein the clamping means comprises at least one clamp for clamping the at least one fixing piece and the reflection mirror together in order to tightly contact the reflection mirror and the connection surface of the at least one fixing piece.

* * * * *